United States Patent Office 3,441,372
Patented Apr. 29, 1969

3,441,372
SOLVENT EXTRACTION PROCESS FOR SEPARATION OF ZINC FROM CADMIUM
John Lionel Pegler and David Peter Pepworth, Avonmouth, England, assignors to Imperial Smelting Corporation (N.S.C.) Limited, London, England, a British company
No Drawing. Filed Jan. 24, 1966, Ser. No. 522,364
Claims priority, application Great Britain, Feb. 1, 1965, 4,271/65
Int. Cl. C01g 9/00, 11/00; B01d 11/02
U.S. Cl. 23—55                                  10 Claims

ABSTRACT OF THE DISCLOSURE

A method of separating zinc from an aqueous chloride solution containing zinc, cadmium and sodium chloride involving subjecting the solution at a pH of 1.5–6 to liquid/liquid extraction with an alkyl ester of phosphoric acid of the formula $$(C_nH_{2n+1})_xH_{(3-x)}PO_4$$

where $n>3$ and $x$ is an integer from 1 to 3, to form an organic phase containing zinc values and recovering zinc values from said organic phase and cadmium values from the aqueous solution.

---

This invention relates to the separation of zinc from cadmium and more espectially but not solely to the recovery of metal values in the recovery of zinc and cadmium values from liquors produced during zinc smelting operations.

It is well known in the art of smelting zinc and lead ores that when sulphide zinc and lead ores are roasted, for example by burning these ores on a Dwight-Lloyd Sinter Machine, some of the valuable metals, more particularly cadmium and a part of the zinc and lead are volatilized. These metals may be volatilized as sulphides, oxides or various other salts, which are carried away with the gases, such as sulphur dioxide and nitrogen, leaving the sinter machine. Some arsenic is also volatilized. Before the sulphur dioxide in the gases can be converted to sulphuric anhydride and hence to sulphuric acid the dust particles entrained in the gases must be removed. This may be done in various ways but one of the most favoured methods is by scrubbing the gases in a wet scrubber, for example, of the Venturi type. In such a scrubber the gases are washed with water or dilute solutions of sulphurous or sulphuric acids. This serves to remove most of the dust particles from the gas and to dissolve out some of the zinc and cadmium. As the scrubber liquor is often recirculated a number of times the concentrations of metals such as zinc and cadmium in the liquor can build up considerably.

The economic recovery of these metal values from such liquors is a problem which has occupied metallurgists in the zinc-smelting industry for some years.

We have now discovered that the said metal values can be efficiently and economically recovered by means of the process according to this invention.

Preferably an aqueous metal-bearing solution (after settling or filtering off the solids) is passed through a cation-exchange resin (preferably in sodium form) on to which cadmium, zinc and other cations are adsorbed. The arsenic, which is in anionic form, passes through the column. The resin is drained, washed free of liquor, e.g. with water and drained again before the next stage.

The cation-exchange resin is regenerated by passing a solution of sodium chloride through it. This restores the resin to the sodium form and yields a chloride solution of the cations which were adsorbed on the resin (together with excess sodium chloride). Such a solution typically contains 3–30 g./l. Zn, 5–30 g./l. Cd, and 100–150 g./l. NaCl together with other cations as $Ca^{++}$ and $Mg^{++}$ in smaller quantities and has a pH of about 2 to 3.

In one aspect the invention consists in a method of separating zinc from cadmium in aqueous chloride solution in which the aqueous solution is subjected to liquid/liquid extraction with an organic solvent which is an alkyl ester of phosphoric acid (either acid or neutral) containing alkyl groups with at least three carbon atoms of general formula $$(C_nH_{2n+1})_xH_{(3-x)}PO_4$$

where $n>3$ and $x=1$, 2 or 3.

When this liquid/liquid extraction is carried out, substantially all the zinc ions are taken into the organic phase and substantially all the cadmium remains in the aqueous phase.

The cadmium may be precipitated from the aqueous phase as an insoluble salt, e.g. sulphide hydroxide or other insoluble salt which can subsequently be treated chemically and physically to give a high-purity cadmium compound.

Zinc may be recovered from the organic phase by contacting this phase with water, dilute sulphuric or nitric acid or dilute aqeuous solutions of salts other than chlorides. The aqueous zinc-bearing solution thus obtained may be used to prepare zinc chemicals by precipitation by known chemical methods. The regenerated organic liquid is recycled to the liquid/liquid extraction process.

Suitable organic phases of use in the liquid/liquid extraction stage include esters of organic and inorganic acids, in particular of phosphoric acid e.g. tributyl phosphate, acid esters, e.g. dioctyl phosphate. These may be used undiluted or alternatively as solutions in inert solvents e.g. hydrocarbons such as xylene or kerosene or water-insoluble higher ketones. However, tributyl phosphate is the preferred organic liquid for use in the process. The process lends itself particularly well to a continuous countercurrent liquid/liquid extraction installation, in which the organic and aqueous phases flow countercurrent to one another in a number of mixing and settling stages. Further, the organic phase leaving one end of such an installation, containing a small residual quantity of cadmium, may be stripped of this cadmium by contacting it with a solution of sodium chloride which will then be added to the aqueous feed liquid entering the installation.

The following conditions are preferred in order to achieve optimum separation of the zinc and cadmium:

(a) The pH of the aqueous solution should be within the range of 1.5 to 6. In more acid solutions the partition co-efficient of cadmium between organic and aqueous phases increases more rapidly than that of zinc thus giving a much less favourable separation factor. In more alkaline solutions the metal hydroxides being to be precipitated.

(b) The concentration of NaCl in the aqueous solution should be within the range of 50–200 g./l. and preferably at least 80 g./l. This is not as critical as condition (a), however, since the partition co-efficients of both zinc and cadmium between the two phases change at approximately the same rate with changing salt concentration.

(c) The temperature of the solution should be kept as low as possible during the extraction stage. Preferred temperatures are below 30° C., e.g. in the range 10°–30° C. and more preferably below 20° C. The separation factor falls off rapidly with increase in temperature.

It has been found surprisingly that tributyl phosphate is an extremely selective solvent for zinc ions, the only other cation found to be removed from the salt-rich aqueous chloride solutions by this solvent being the gold cation. Thus this solvent provides a surprisingly effective means for separating zinc from cadmium.

Where the starting solutions contain a high cadmium concentration, then after zinc has been removed from the aqueous phase with the solvent, the cadmium-containing aqueous liquor can be acidified to a pH less than 1 and the acidified aqueous liquor treated with a further portion of the solvent to extract the cadmium into the organic phase and thus effect a separation of cadmium from other cations present. This process has the advantage that in this way cadmium ions can be extracted into the solvent phase without being contaminated with other cations. This cadmium can subsequently be removed from the organic phase by reaction with water, dilute $HNO_3$ or $H_2SO_4$ or the aqueous solution of a salt other than a chloride. In this way, an aqueous solution containing substantially only cadmium cations can be obtained from which high-purity cadmium compounds can be precipitated.

The invention will be further illustrated and explained by reference to the following non-limiting examples:

EXAMPLE 1

50 mls. of ion-exchange liquor containing 17.8 g./l. Cd, 3.3 g./l. Zn, 0.21 g./l. Ca, 0.16 g./l. Pb, 0.028 g./l. Fe and with a salt content of about 100 g./l. NaCl was stirred for 10 minutes with 50 mls. of tributyl phosphate. The layers were separated and analysed for zinc and cadmium. This was repeated at pH values of 2.5 and 1.0.

|  | Aqueous layer | | Organic layer | | Partition coefficient | | |
|---|---|---|---|---|---|---|---|
| pH | G./l. Zn | G./l. Cd | G./l. Zn | G./l. Cd | Zn | Cd | Separation factor |
| 2.5 | 0.71 | 20.3 | 2.72 | 1.06 | 3.82 | 0.052 | 73 |
| 2.5 | 0.68 | 21.2 | 2.74 | 1.11 | 4.04 | 0.052 | 78 |
| 1.0 | 0.42 | 11.1 | 2.64 | 7.00 | 7.3 | 0.63 | 10 |

EXAMPLE 2

Using a solution of 40% di(2-ethylhexyl)phosphate in kerosene the following partition coefficients and separation factors were obtained:

Zinc concentration:
    Aqueous _____ g./l__ 1.68
    Organic _____ g./l__ 1.95
Zinc partition coefficient _____ 1.16
Cd concentration:
    Aqueous _____ g./l__ 21.0
    Organic _____ g./l__ 0.24
Cd partition coefficient _____ 0.011

This gives a separation factor Zn/Cd of 104. The initial pH of the aqueous solution was 4.0 (approx.).

EXAMPLE 3

In a nine-stage counter-current liquid/liquid extraction installation using tributyl phosphate/aqueous chloride solutions with two stages of sodium chloride solution reflux to remove residual cadmium from the organic phase (the sodium chloride solution flow rate being 20% of the primary aqueous feed) the average concentrations of zinc and cadmium in the aqueous input solution were:

G./l.
Cd _____ 9.7
Zn _____ 5.0 over a period of 41 days operation (4170 gallons of cadmium-bearing solution treated).

The average zinc and cadmium concentrations in the aqueous liquor leaving the installation were:

G./l.
Cd _____ 8.2
Zn _____ 0.0008 over the same period.

The zinc was removed from the organic phase by backwashing the organic extract with very dilute $H_2SO_4$ in five stages of a liquid/liquid extraction installation. This gave an aqueuos solution which contained 5.0 g./l. zinc and 0.046 g./l. cadmium.

It should be emphasized that these are average figures over 41 days and there were periods when even better separations were obtained.

We claim:
1. A method of separating zinc from an aqueous chloride solution containing zinc, cadmium and sodium chloride which comprises subjecting the aqueous solution at a pH in the range of 1.5 to 6 to liquid/liquid extraction with an organic extractant which is an alkyl ester of phosphoric acid having the formula

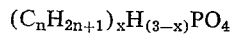

$(C_nH_{2n+1})_xH_{(3-x)}PO_4$ where $n>3$ and $x$ is an integer from 1 to 3, to form an organic phase containing zinc values and recovering zinc values from the organic phase and cadmium values from the aqueous solution.

2. A method as claimed in claim 1 wherein the organic extractant is tributyl phosphate or di(2-ethylhexyl) phosphate.

3. A method as claimed in claim 1 wherein the organic extractant is tributyl phosphate.

4. A method as claimed in claim 1 wherein the organic extractant is di(2-ethylhexyl)phosphate.

5. A method as claimed in any one of claims 1–4 in which the aqueous chloride solution is obtained by regenerating, with sodium chloride solution, a cation-exchange resin on to which zinc and cadmium ions have been adsorbed.

6. A method as claimed in any one of claims 1–4 in which the concentration of sodium chloride in the aqueous solution is within the range 50–200 g./l.

7. A method as claimed in any one of claims 1–4 in which the concentration of sodium chloride in the aqueous solution is at least 80 g./l.

8. A method as claimed in any one of claims 1–4 in which the temperature during the extraction is kept below 30° C.

9. A method as claimed in any one of claims 1–4 in which the temperature during the extraction is kept below 20° C.

10. A method as claimed in any one of claims 1–4 in which the cadmium containing aqueous liquor is acidified to a pH of less than 1 and treated with a further portion of solvent to extract the cadmium into the organic phase.

References Cited
UNITED STATES PATENTS
2,992,894   7/1961   Hazen et al. _____ 23—147

L. DEWAYNE RUTLEDGE, Primary Examiner.
T. R. FRYE, Assistant Examiner.

U.S. Cl. X.R.
23—50; 75—101, 120, 121